Sept. 21, 1965 R. D. NIELSEN 3,207,930
GATE VOLTAGE GENERATOR
Filed Nov. 18, 1963
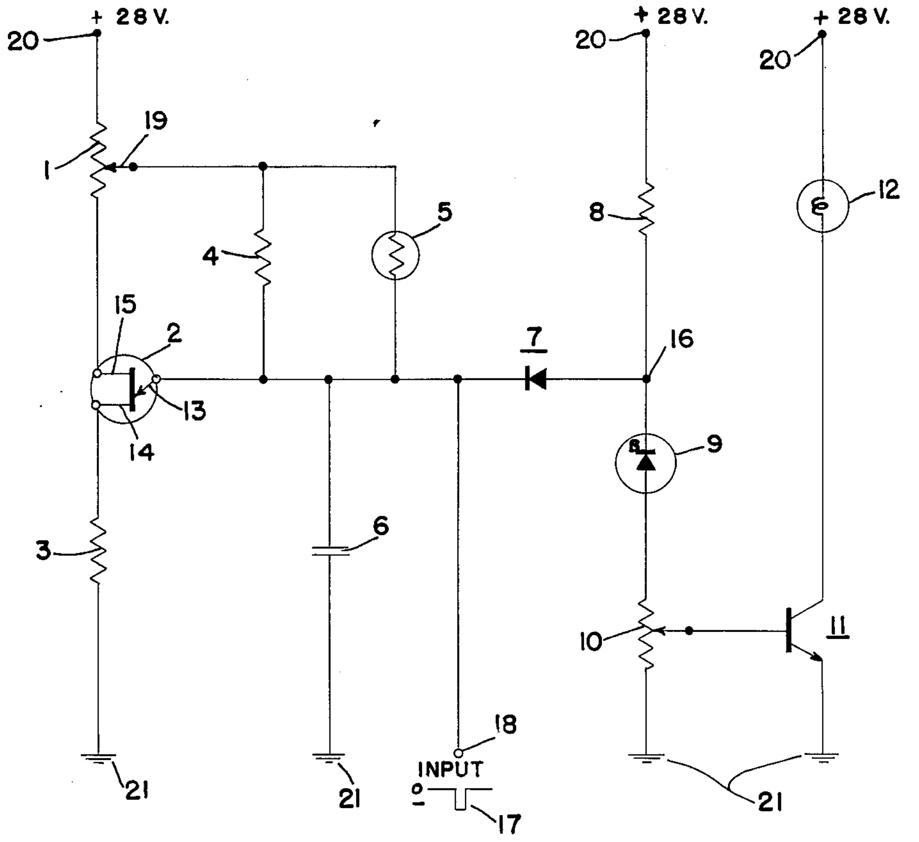
INVENTOR.
RICHARD D. NIELSEN
BY Harry M. Saragovitz,
Edward J. Kelly,
Herbert Berl & ATTORNEYS.
S. Dubroff

United States Patent Office

3,207,930

Patented Sept. 21, 1965

3,207,930

GATE VOLTAGE GENERATOR

Richard D. Nielsen, Salt Lake City, Utah, assignor, by mesne assignments, to the United States of America as represented by the Secretary of the Army

Filed Nov. 18, 1963, Ser. No. 324,594
6 Claims. (Cl. 307—88.5)

This invention relates to gate voltage generators, and has for its object to provide an improved gate voltage generator which is capable of generating a gate voltage pulse of several seconds duration and may be recycled either during or immediately following the existence of such pulse.

Various types of multivibrators have been used to generate gate voltage pulses. Some of these multivibrators have involved two or more transistors or like semi-conductor devices. These multivibrators, however, have proved to be unsatisfactory for generating gating pulses of several seconds duration. This is because (1) the parameters of their timing networks are dependent on the parameters of other circuits including the transistors, (2) the pulses which they generate are each followed by a "dead" period during which the generator can not be recycled, and (3) they are sensitive to negative-going transients of the power source. The last of these difficulties is especially true in the case of multivibrators which are required to generate a gating pulse of several seconds duration and to switch connections transmitting a medium amount of power.

It is a further object of the present invention to provide an improved gate voltage generator which avoids these difficulties while effectively utilizing semi-conductor devices as its active elements.

The invention will be better understood from the following description when considered in connection with the accompanying drawing and its scope is indicated by the appended claims.

The single figure of the drawing is a schematic circuit diagram of a gate voltage pulse generator embodying the invention.

Referring to the drawing, it will be seen that the components of the voltage pulse generator include a voltage divider 1, a unijunction transistor 2, a timing network comprising two parallel-connected resistors 4 and 5 and a capacitor 6, and a Zener diode 9 which functions as a current-conductive voltage-operated control means or switching control means for the generator. Three voltage-control resistors 1, 3 and 8 provide the proper bias to the unijunction transistor 2. The resistor 5 is of the temperature-sensitive type and provides compensation for temperature variations of the unijunction transistor. The diode 7 functions as a direct-current block during the gate cycle as will be seen. The voltage-control resistor 8 and an output resistor 10 are effectively in series with and provide the proper bias for the Zener diode. The resistor 10 also provides a signal pickoff or control voltage that actuates a current-switching transistor 11 and energizes a load device indicated as a lamp 12. The resistor 10, or any suitable impedance element or load device connected in its place, may be the load if the specific application permits. This would eliminate the transistor 11.

During the "off" cycle of the generator, an insignificant amount of current flows through the Zener diode 9 and the resistor 10, the transistor 11 is non-conducting, and the lamp 12 is not energized. At this time, current flows through the resistor 8 and diode 7 to the emitter 13 of the unijunction transistor 2, which also includes first and second base contacts or bases 14 and 15, respectively. This current flows through the first base 14 and the base or voltage-control resistor 3 and, by reason of voltage drop in the control resistor 8, establishes, at a common junction point or terminal 16 between the voltage-control resistor 8 and the diode 9, a voltage which is lower than the reverse breakdown voltage of that diode. Also the timing capacitor 6 is thus discharged through transistor 2 and the resistor 3.

Generation of a gating pulse is initiated by applying a trigger pulse 17 of a negative-going polarity to the generator input terminal, indicated at 18 and connected with the unijunction emitter 13 and the timing capacity 6. This drives the emitter negatively and the unijunction transistor 2 to a cut-off state. This stops the current flow through the transistor and permits the timing capacitor 6 to charge and permits the voltage at the point 16 to rise until the Zener diode 9 conducts reverse current. Charging current flows to the capacitor 6 and when the charge voltage exceeds the Zener voltage at the terminal 16, the diode 7 becomes reverse biased and blocks the flow of current from the capacitor 6. The capacitor may thus be charged to a level above the Zener voltage to fire the transistor 2. The resulting Zener diode current flow through the resistor 10 produces at the base of the current switching transistor 11 a bias voltage by which this transistor is made to conduct and thus energize the lamp 12. The duration of the gating pulse is determined by the total charging time of the capacitor 6 through the diode 7 and through the resistors 4 and 5 from the voltage-divider 1 which may be adjusted by the contact 19.

When the positive charge through the resistors 4 and 5 further builds up on the timing capacitor 6 sufficiently to again cause firing of the transistor 2, that is, conduction from the emitter 13 to the base 14, the capacitor again discharges. The voltage at the terminal 16 drops as current again flows through the diode 7, and the Zener diode 9 substantially cuts off current flow to the output resistor 10 and the load 12, thereby terminating the output pulse. The flow of current through the diode 7 and the control resistor 8 maintains the generator in the "off" cycle. Upon receiving a negative-going pulse at the input terminal 18, the cycle then repeats to produce the desired timed pulse or signal output, which in this case is the pulsing light from the lamp 12.

Additional trigger pulses applied to the input terminal 18 during a gate transmission restores the voltage level at this terminal to the voltage from which the charging time of the capacitor 6 began. This permits a complete recycle of the timed gate interval at any point in the operation regardless of whether or not a gating pulse is being transmitted by the generator.

The supply circuits may all be D.-C. operated, for example at 28 volts positive, as at the supply terminals 20, with respect to a common return connection or ground 21 for the system. A common supply source of operating current at that voltage may thus be used with this system.

Suitable values and commercial types of the various elements of the generator circuit are listed below, each element being identified by the reference numeral applied to it in the drawing.

| | |
|---|---|
| 1 | 5 KΩ |
| 2 | 2N492 |
| 3 | 270Ω |
| 4 | 620 KΩ |
| 5 | 10 MΩ |
| 6 | 50 mfd. |
| 7 | IN483 |
| 8 | 2.7 KΩ |
| 9 | SV1008 |
| 10 | 200Ω |
| 11 | 2N656 |
| 12 | #327 Incandescent Lamp |

Outstanding features of the generator are that timed gate intervals of several seconds are obtainable, such timed intervals are independent of other circuit parameters, the magnitude of the load is independent of the timing network, and the timed intervals can be started over again during and right after the quasi-stable on condition of the generator.

As compared to previously available gating pulse generators, the present generator has the advantage that fewer components are needed for high power switching, a wide range of timed gate intervals are possible, a wide range of loads can be switched, only a positive D.C. voltage is involved, the independence of the timing network reduces the circuit sensitivity to negative going power supply transients, and the time base of periodic or random signals can be extended because of the re-cycling feature during and right after the quasi-stable "on" condition of the generator. It is to be understood that the invention may be carried into effect by transistors and diodes of different types.

I claim:

1. A gate voltage generator, comprising in combination, high and low voltage direct-current supply terminals, a voltage-control resistor, an output impedance element for said generator, current-conductive voltage-operated control means connected to the high-voltage terminal through said voltage-control resistor and to said low voltage terminal through said output impedance element, a timing circuit including a resistor and a capacitor connected between said terminals, a unijunction transistor having an emitter electrode connected to a first junction of said timing circuit resistor and capacitor and having first and second bases connected respectively to the low and high-voltage terminals through different resistor elements, a diode connected between the emitter and a second junction of the voltage control resistor and said control means and poled for conduction to the emitter from said second junction, whereby the timing capacitor is discharged through the emitter and first base of said transistor and the control device is cut off in response to emitter current flow through said diode from said second junction and the control resistor, and means for applying a trigger pulse to the emitter for cutting off said transistor and said emitter current flow, thereby to permit said timing capacitor to charge and the voltage at said second junction to increase and cause said control means to conduct current through said output impedance element in a pulse terminated by the restoration of said emitter current flow and the discharge of said capacitor.

2. A gate voltage generator as defined in claim 1, wherein the current-conductive voltage-operated control means is a Zener diode having a Zener voltage less than the emitter voltage of the unijunction transistor for effecting emitter current flow.

3. A gate voltage generator comprising in combination, high and low-voltage direct-current supply terminals, a load device, a switching device connected to complete a circuit from said terminals through said load device, a voltage-control resistor, an output resistor, switching-device control means connected to said high voltage terminal through said voltage-control resistor and to said low voltage terminal through said output resistor, a timing circuit including a resistor connected to said high-voltage terminal and a capacitor connected to said low-voltage terminal, a unijunction transistor having its emitter connected to the junction of said timing circuit resistor and capacitor and having each of its bases connected to a different one of said supply terminals through different resistance elements, a diode connected between said emitter and the junction of said voltage-control resistor and said switching-control means and poled for conduction to said emitter, the values of said various resistors being such that current flows through said diode and said voltage control resistor to maintain said capacitor discharged, and means for applying to the high voltage side of said capacitor and the emitter a trigger pulse whereby said transistor is cut off, the current through said diode and said voltage control resistor is interrupted, the voltage applied to said switching-device control means is raised, and said switching means is operated to connect said load device between said terminals in a predetermined gating cycle.

4. A gate voltage generator according to claim 3, wherein said switching device is a transistor connected with said output resistor.

5. A gate voltage generator according to claim 3, wherein said switching-device control means is a Zener diode.

6. A gate voltage generator according to claim 3, wherein said timing circuit includes means to compensate for temperature variations of said unijunction transistor.

No references cited.

ARTHUR GAUSS, *Primary Examiner.*